Figure 1:
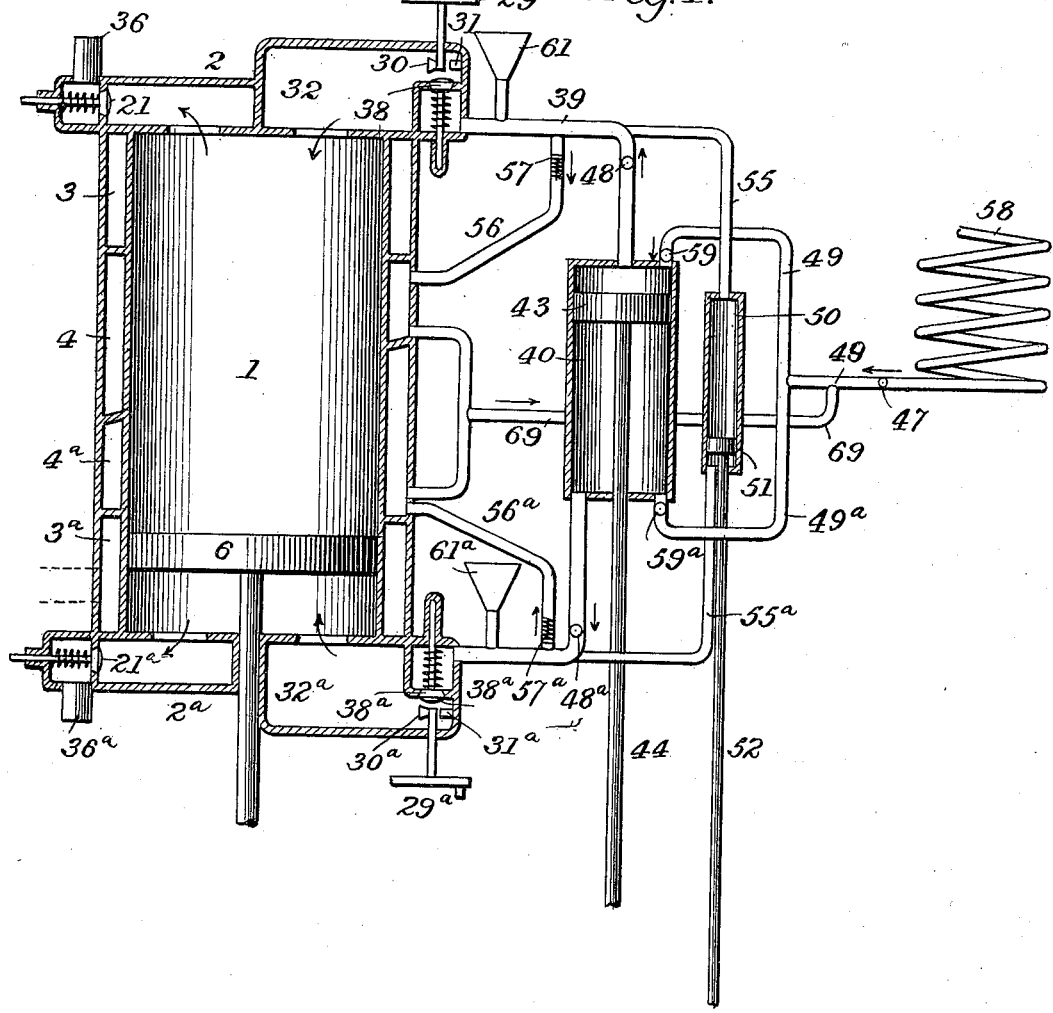

No. 617,530. Patented Jan. 10, 1899.
A. HOWARD & W. R. GREEN.
DIRECT CONVERSION OF ENERGY OF FUEL AND AN EXPANSION MEDIUM INTO POWER.
(Application filed Aug. 19, 1898.)

(No Model.) 5 Sheets—Sheet 1.

Witnesses
Inventors
Augustus Howard
Woward R Green

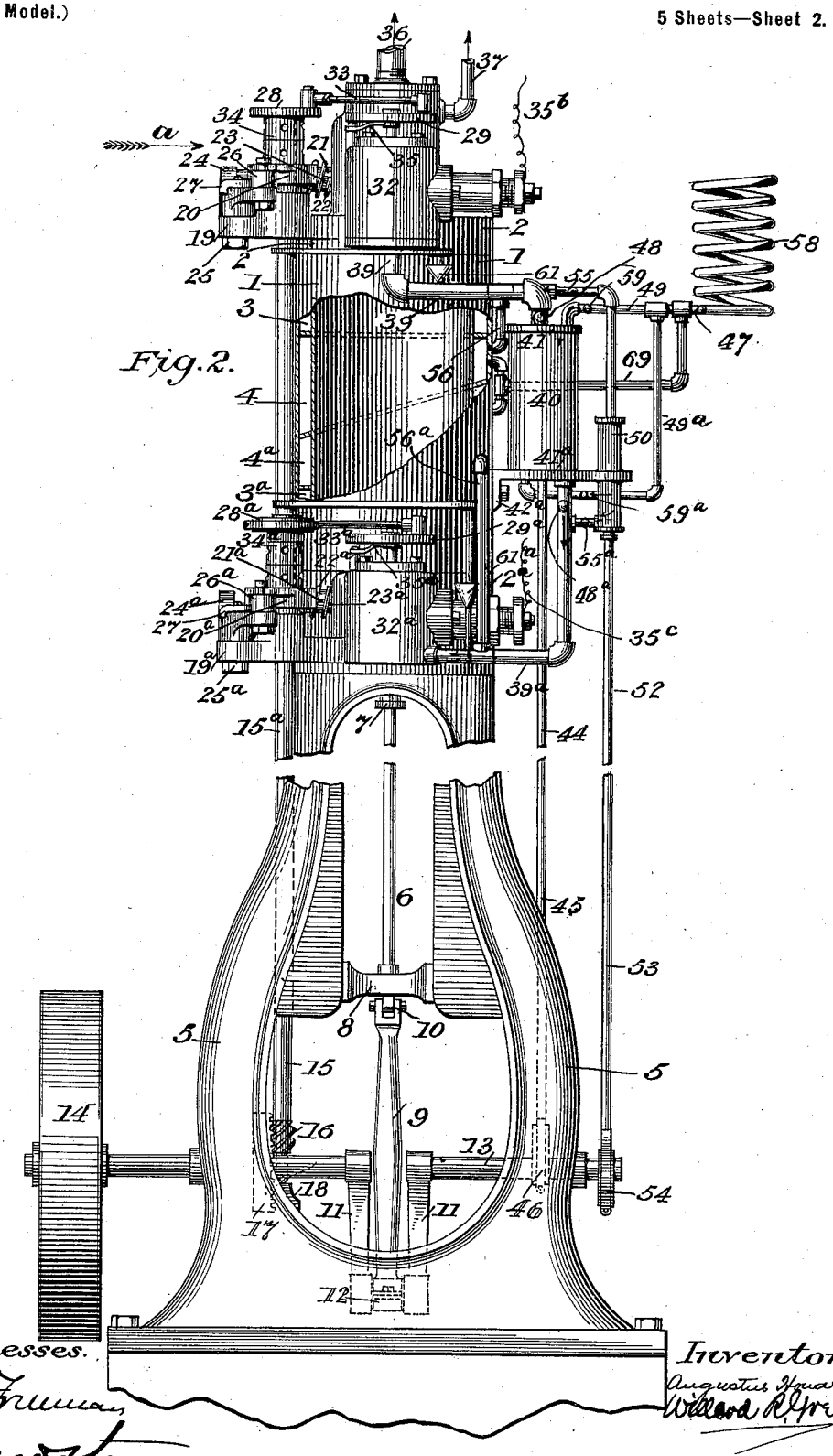

No. 617,530. Patented Jan. 10, 1899.
A. HOWARD & W. R. GREEN.
DIRECT CONVERSION OF ENERGY OF FUEL AND AN EXPANSION MEDIUM INTO POWER.
(Application filed Aug. 19, 1898.)
(No Model.) 5 Sheets—Sheet 3.
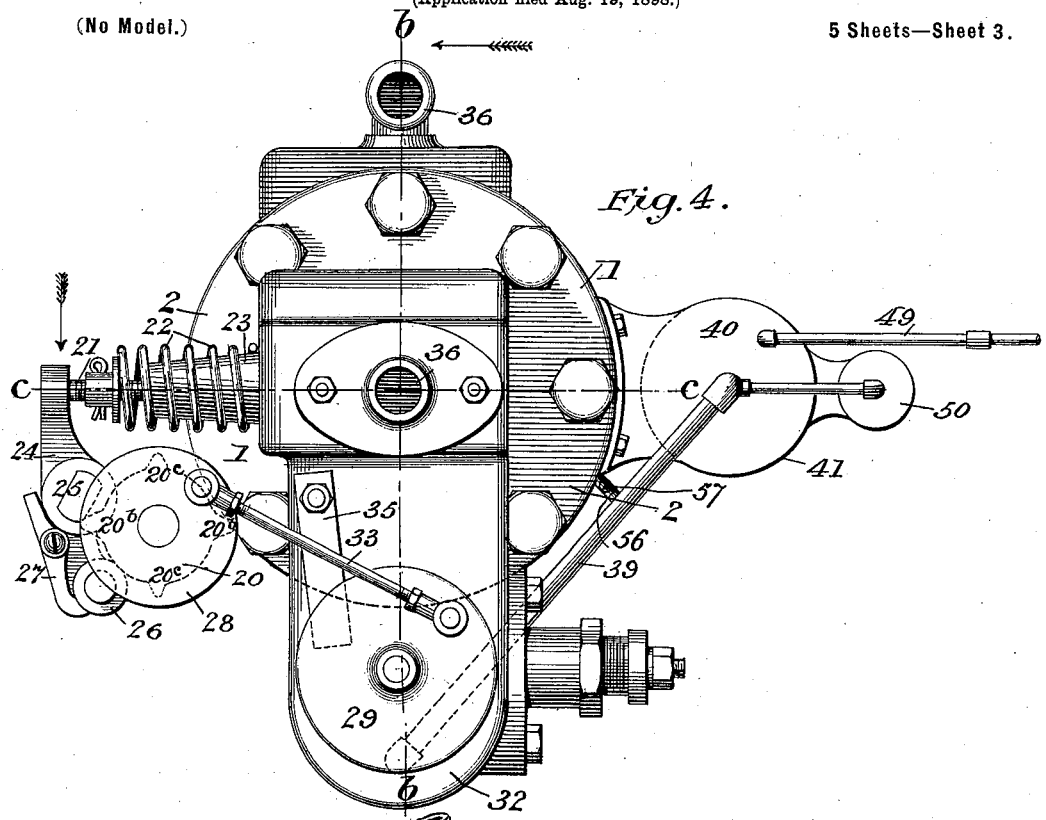
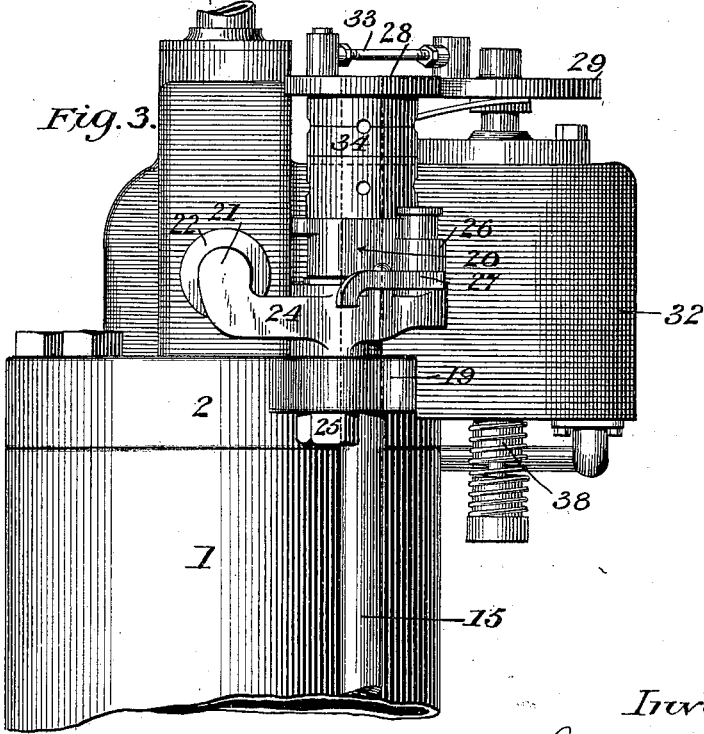
Witnesses. Inventors.

No. 617,530. Patented Jan. 10, 1899.
A. HOWARD & W. R. GREEN.
DIRECT CONVERSION OF ENERGY OF FUEL AND AN EXPANSION MEDIUM INTO POWER.
(Application filed Aug. 19, 1898.)
(No Model.) 5 Sheets—Sheet 4.
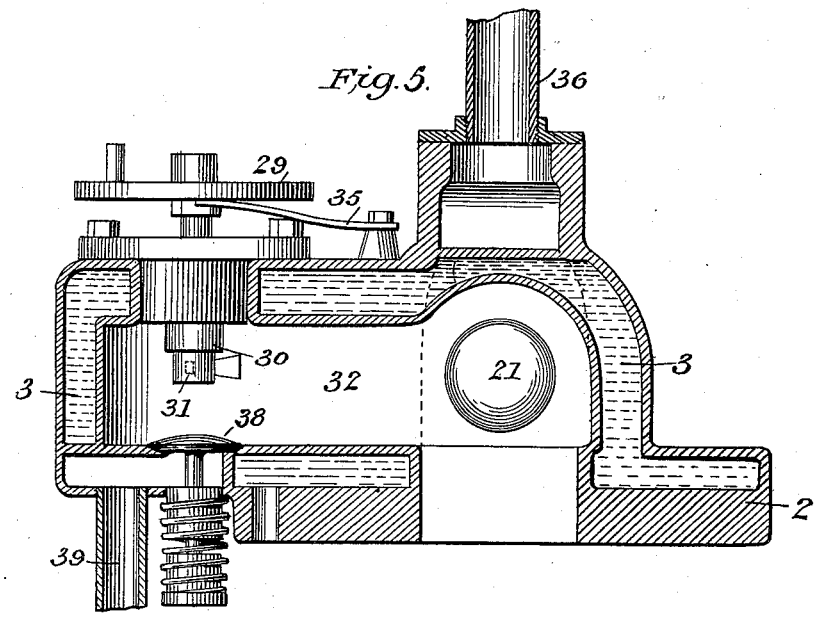
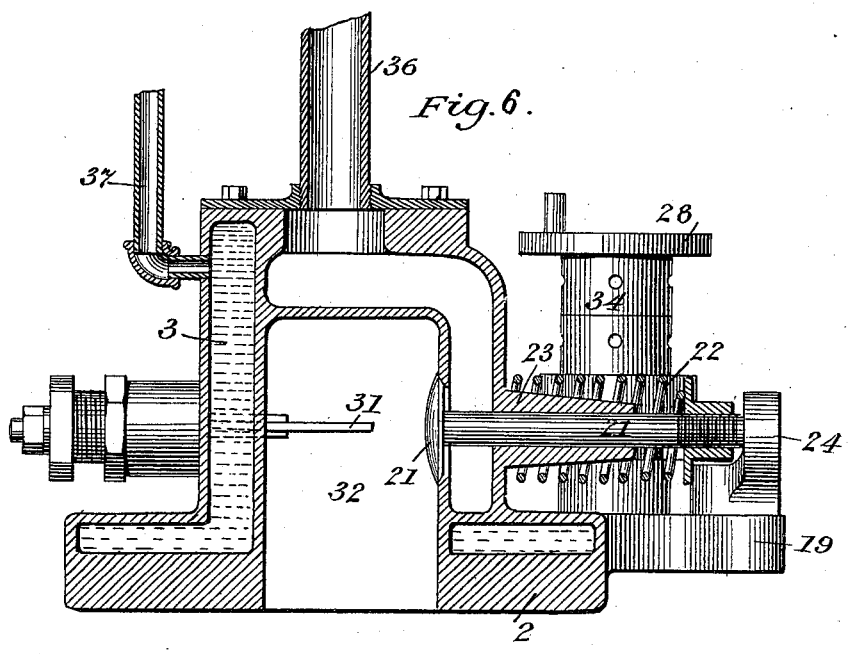

No. 617,530. Patented Jan. 10, 1899.
A. HOWARD & W. R. GREEN.
DIRECT CONVERSION OF ENERGY OF FUEL AND AN EXPANSION MEDIUM INTO POWER.
(Application filed Aug. 19, 1898.)
(No Model.) 5 Sheets—Sheet 5.
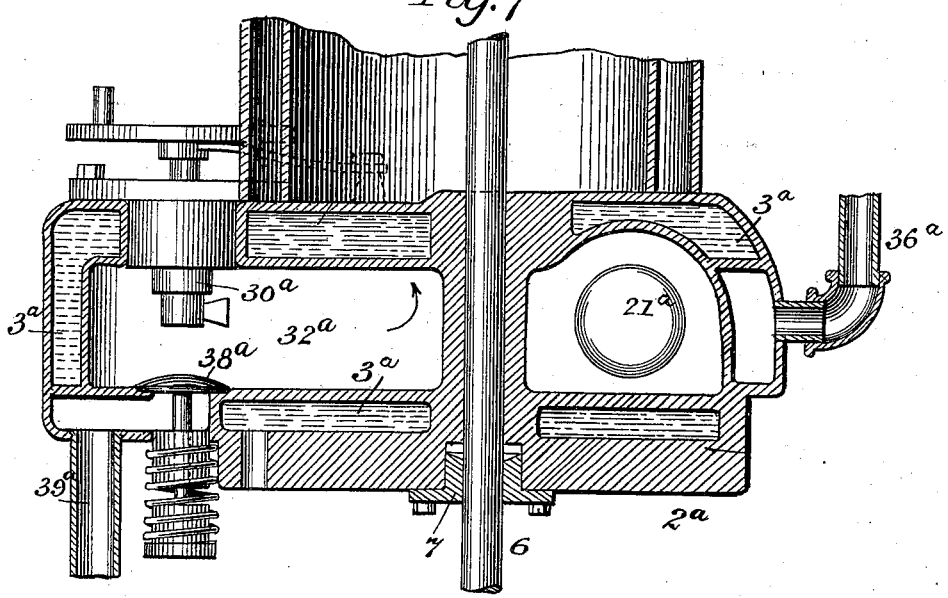
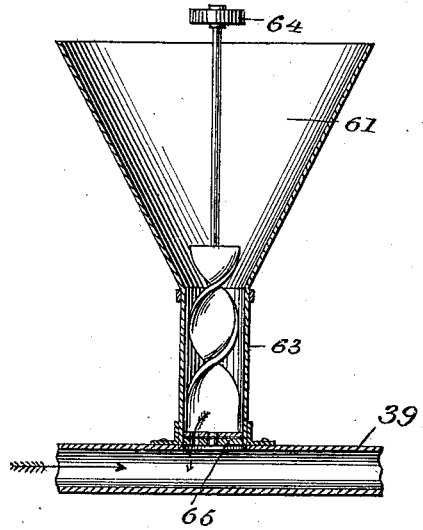
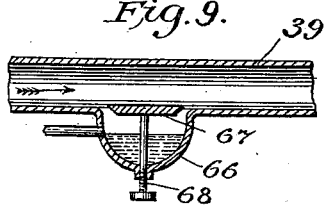
Witnesses. Inventors.

United States Patent Office.

AUGUSTUS HOWARD, OF SAN FRANCISCO, CALIFORNIA, AND WILLARD R. GREEN, OF DENVER, COLORADO; SAID HOWARD ASSIGNOR TO SAID GREEN.

DIRECT CONVERSION OF ENERGY OF FUEL AND AN EXPANSION MEDIUM INTO POWER.

SPECIFICATION forming part of Letters Patent No. 617,530, dated January 10, 1899.

Application filed August 19, 1898. Serial No. 688,955. (No model.)

*To all whom it may concern:*

Be it known that we, AUGUSTUS HOWARD, a subject of the Queen of Great Britain, residing in the city and county of San Francisco and State of California, and WILLARD REED GREEN, a citizen of the United States, residing at Denver, in the county of Arapahoe and State of Colorado, have invented certain new and useful Improvements in the Direct Conversion of the Energy of Fuel and an Expansion Medium into Power, of which the following is a specification.

Our invention relates to improvements in the direct conversion of the energy of fuel and an expansion medium into power, and has for its object the accomplishment of this end more effectively and at less expense; and to these ends the invention consists in the various features of invention, as hereinafter more particularly set forth.

The apparatus hereinafter described as embodying our improved construction and as showing a means for carrying out our invention belongs to a class of machines known as "internal-combustion engines."

Referring to the accompanying drawings, Figure 1 is a diagrammatic representation of a construction embodying the general features of our apparatus and illustrating an application of the invention. Fig. 2 is a representation in elevation of an internal-combustion engine embodying our invention and working in accordance with our invention, some of the parts being broken away to show the interior construction. Fig. 3 is an elevation of the upper portion of the cylinder and upper cylinder-head, looking in the direction of the arrow *a*, Fig. 2. Fig. 4 is a plan view of the upper cylinder-head and various attached parts. Fig. 5 is a sectional view of the upper cylinder-head, combustion-chamber, and attached parts, taken on the line *b b*, Fig. 4. Fig. 6 is a sectional view on the line *c c*, Fig. 4. Fig. 7 is a sectional view of the lower cylinder-head and combustion-chamber, taken on the line *b b*, Fig. 4. Fig. 8 is a detached sectional view of a feed-hopper for solid fuel. Fig. 9 is a sectional view of a feed for liquid fuel.

Like numerals refer to like parts in the various figures, and the corresponding parts at the opposite ends of the cylinder are lettered the same, the upper portion being in plain numerals and the lower portion having the additional designation "a."

Our invention is based, broadly stated, upon the well-known fact that the lower the temperature of an expansion medium—such, for instance, as air—the greater is its expansive power upon the application of heat and that as the temperature of such medium rises the loss of expansive power rapidly increases. It is further based on the fact that an expansion medium at a low temperature requires less power to produce a given compression. It is also known that an expansion medium, such as air, at a low temperature contains relatively more moisture, which requires a greater power to produce a given compression, and, further, that in proportion as this moisture is removed less power is required to produce subsequent compression of said air. We utilize these three general principles in our invention, and our invention is based, generally speaking, on these broad principles.

In carrying out our invention one of the principal objects is to utilize an expansion medium, such as air, at a relatively low temperature, to thereby attain relatively greater compression of the expansion medium by the same expenditure of power, and, further, to relieve the expansion medium at the low temperature from the excess of moisture, thereby economizing in the power required to produce a given compression and temperature of the expansion medium. In applying this general principle, on which our invention is based, we make use of an internal-combustion engine embodying a double-acting cylinder and piston and apply power to both sides of the piston-head at each revolution of the crank, such power being thus applied to both sides of the piston at the desired compression and at approximately atmospheric temperature of the expansion medium, plus only the heat of combustion, and which medium has preferably been deprived to a greater or less extent of its moisture.

In carrying out our invention we proceed in what may be termed a "series" of steps or stages, which may be briefly stated as follows: Taking atmospheric air at ordinary temperatures as an expansion medium, we first rarefy or expand the air to a greater or less extent, removing at the same time some of the moisture, and then compress the air to approximately the desired degree. This compression of the expansion medium develops some heat, which it is desirable to eliminate. We then further expand this compressed expansion medium to a greater degree, thereby reducing the temperature and further eliminating moisture, and resulting in the expansion medium being in better condition to receive the final compression to working pressure by a less expenditure of power and with less generation of heat. This expansion medium is then compressed to the desired degree and is in a condition to receive the fuel of combustion, which combustion furnishes the heat for expansion. Preferably in introducing this fuel of combustion into the compressed expansion medium we further compress said medium to a relatively small degree, thereby increasing the volume of expansion produced by the heat of combustion. Immediately at the introduction of the fuel of combustion into the compressed expansion medium the fuel is ignited by independent or extraneous means, and the heat of combustion expands the expansion medium, producing the desired power or pressure against the resistance.

Referring to the diagram, Fig. 1, which shows an embodiment of an apparatus which may be used in carrying out our invention above set forth, and for the purposes of illustration, we will assume that atmospheric air at ordinary temperatures is drawn into a compressor of ordinary form (represented at 40) through a coil 58 and suitable connections. As the air is drawn into the cylinder of the compressor 40 it is rarefied or expanded to a greater or less degree, due to the friction of the air in the coil, and the moisture in the air is eliminated to a greater or less extent. When the cylinder of the compressor is thus filled with this rarefied or expanded air, it is compressed in said cylinder, say, to a pressure of eighty pounds, some heat being generated in this compression. This body of compressed air in the compressor is transferred to the cylinder 1, the relative size of which compared to the compressor is larger, and as a consequence this air, which was previously compressed to eighty pounds, quickly expands until it reaches a relatively low pressure, and in thus expanding the temperature is reduced below its initial temperature. It is to be observed that the compressed air on reaching the cylinder 1 of relatively large proportions expands exceedingly quickly, and this time element is an important feature, as it aids greatly in the reduction of the temperature of the expansion medium, leaving it in a condition to be recompressed with less power and with less generation of heat. The expanded medium is then recompressed in the cylinder, say, to a pressure of eighty pounds, as before, and this results in the medium being at a lower temperature than at the first compression and in a better condition to receive the fuel of combustion. After this second compression of eighty pounds the fuel of combustion is introduced into the compressed expansion medium, and this may be done by means of the injection into the combustion-cylinder of a comparatively small quantity of air under a higher compression than that in the working cylinder, against the resistance or pressure of which it must enter, the said injection of air being passed through the fuel-supply and carrying with it the desired quota of fuel, and, as indicated in the diagram, we may use an air-compressing ram 50, connected to the combustion-chamber 32, taking its supply of fuel from the feeder 61. This air from the ram 50 is compressed, as stated, to a higher degree than the compression medium in the cylinder—as, for instance, it may be compressed to ninety pounds—and this being forced into the compressed expansion medium not only introduces the fuel of combustion, but increases the pressure of the compressed medium. Any tendency to an increase of temperature in the expansion medium resulting from the introduction of said injection of air acting as the vehicle for said fuel is counteracted by the expansion of said injection in a medium of less pressure and, further, by the vaporization of any moisture in said fuel. Also it is without any injurious effect owing to the fact of its injection at the same time as the fuel, which is at once ignited to produce the then desired heat. The fuel of combustion being immediately ignited, the compressed medium, being at relatively low temperature and deprived of its moisture to a greater or less extent, responds more readily to the heat of combustion and expands to a greater extent, producing greater increase of volume, and consequently greater energy of pressure on the resistance.

Having thus set forth our improved method of operation, we will now describe our improved apparatus, which shows one embodiment well adapted to carry out our method, as well as showing various improved features of construction and arrangement of parts, and an embodiment whereby the improved results due to our method of alternate compression and expansion can be applied to both sides of the piston of an internal-combustion engine at each revolution of the crank.

While the construction about to be described has been found a satisfactory embodiment of our invention and a construction well adapted to carry out our invention, it will be understood that our invention is not limited to the details of construction and arrangement of parts shown and described, but that it may be varied by those skilled in the art to adapt the invention for different purposes and conditions without departing from the principles thereof.

Referring to the drawings, 1 represents the cylinder of an internal-combustion engine, provided, preferably, at its ends with water-jackets 3 3ª and around its middle portion with air-jackets 4 4ª, divided by a wall crossing the middle of the cylinder at an angle of from twenty degrees to thirty degrees, as shown, the function of which jackets will be pointed out hereinafter.

The cylinder-heads 2 2ª are provided with entrance and discharge ports for the admission of air and fuel and the exhaust of waste gases and products of combustion, and are also preferably jacketed for the circulation of water, as indicated in Figs. 5, 6, and 7, and having a supply-pipe 37 for the water. This cylinder and attachments are mounted on a suitable frame 5 of any desired character, and the piston 6 of the cylinder is provided with a piston-rod 6ª, passing through the piston-rod gland 7 and connected to the connecting-rod 9 by a pin 10, and this rod is connected to the engine-crank 11 by crank-pin 12, the crank being mounted on the shaft 13, carrying a fly-wheel 14. Connected to be driven from the crank-shaft 13 is the shaft 15, in the present instance it being driven by a pinion 16, engaging a gear-wheel 17 on the crank-shaft, and the tail of the shaft is mounted on a bracket 18, and we preferably provide brackets 19 19ª on the cylinder heads or sides to support the shaft. This shaft 15 carries double cams 20 and 20ª for operating the exhaust-valves 21 21ª, which valves are provided with springs, as 22 22ª, to insure their seating, and the valves pass through the glands 23 23ª and are immediately operated by levers 24 24ª, journaled at 25 25ª and operated by the double cams 20 and 20ª. These cams may be of any desired construction, and, as shown more particularly in Figs. 3 and 4, they are provided with two sets of cams or projections 20ᵇ and 20ᶜ, arranged at right angles to each other and in different planes, and coöperate with rollers 26 26ª or extensions of the levers 24 24ª, and these rollers can be adjusted so as to be in the path of the cam 20ᶜ only or in the path of both sets of cams 20ᵇ and 20ᶜ, the trigger 27 being a convenient means for holding the rollers 26 26ª in an elevated or adjusted position when desired. It may be remarked that in Fig. 3 the roller 26 is shown in a position to be operated by the cam 20ᵇ only.

The object of the double-cam arrangement is that under some circumstances—as, for instance, when the engine is running at high speed—it is found desirable to have a somewhat further exhaust of the products of combustion—as, for instance, to allow the exhaust-valve to open during a portion of the upstroke of the piston as well as during a portion of the downstroke.

It will be understood, of course, that the shape of the cams or projections may be varied so as to determine the character of the opening of the exhaust-valves as to its length and relation to the other operative parts of the engine.

The cylinder-heads 2 and 2ª are each provided with suitable exhaust-ports 36 and 36ª, and which exhaust-ports are controlled by exhaust-valves 21 21ª, actuated by the cams 20 and 20ª, as stated. The cylinder-heads 2 and 2ª are also formed with combustion-chambers 32 32ª therein, opening directly into the cylinder 1.

The passage of the expansion medium into the cylinder 1 is through the inlet-passage 39, controlled by what we call a "pressure-valve" 38 38ª, and which valve is operated by the pressures thereon and governs the admission of the expansion medium to the cylinder 1.

Mounted on the shaft 15, which may be provided with collars 34 for relieving the weight of the shaft from the tail-bearing, is an eccentric disk 28, adapted to be connected to the sparker-disk 29 29ª, mounted on the head 2 2ª and carrying a sparker 30 30ª, extending into the combustion-chamber 32 32ª and coöperating with a wipe-sparker 31 31ª, mounted therein, and the disks 28 and 29 are connected, preferably, by the movable and extensible rod 33 33ª, by means of which the time of making the spark may be accurately adjusted with relation to the other operations of the engine. The electrical connections with the spark are of any suitable character, 35 35ª showing one of the spark-conductors at each end of the cylinder and 35 35ᶜ the other terminals of the respective ends of the cylinder.

Arranged in any suitable position with relation to the cylinder and, as shown, mounted on brackets 42, connected to the cylinder 1, is an air-compressor 40, having suitable heads 41 41ª and provided with a piston 43, piston-rod 44, connecting-rod 45, and eccentric 46, mounted in the present instance on the shaft 13, and it will be noted that the eccentric is so mounted that the piston of the compressor is practically at its extreme upward stroke when the piston 6 in the engine-cylinder is practically at the extreme of its downward stroke. The ends of the compressor-cylinder 40 are directly connected by the passages 39 39ª with the combustion-chambers or with the cylinder 1, and branching from these passages 39 39ª are relief-pipes 56 56ª, provided with check-valves 57 57ª and connecting, respectively, with the air-jackets 4 4ª on the central portion of cylinder 1.

The pipes 39 39ª are provided with check-valves 48 48ª, respectively, permitting the flow of the compression medium from the compressor into the pipe, but preventing its reflow to the compressor.

Arranged in suitable relation to the other parts of the engine and in the present instance mounted on an extension of the bracket 42 is a ram 50, having a piston 51, piston-rod 52, connecting-rod 53, and eccentric 54, mounted on the shaft 13, and it will be noted that the eccentric is so arranged that the piston 51 moves substantially in harmony with the piston 6, preferably being given a little lead, so that its stroke will be completed before the stroke of the piston in the main cylinder. This ram is provided with pipes 55 55$^a$, connected in the present instance with the pipes or passages 39 39$^a$, respectively, beyond the check-valves 48, so that the compressed medium is forced into the combustion chamber or cylinder and cannot enter the compressor, although the compressed medium from the compressor 40 can pass through the pipes 55 55$^a$, respectively, into the opposite ends of the ram 50.

Connected to the opposite ends of the compressor 40 are the inlets, in the form of pipes 49 49$^a$, provided, respectively, with check-valves 59 59$^a$, by which pipes the compressed medium or air is supplied to the compressor, and connected to these pipes 49 49$^a$ is a coil 58, through which the air from the atmosphere is drawn as a primary supply to the compressor, and interposed in this coil is a check-valve 47. Also connected with the inlet-pipes 49 49$^a$ is a pipe 69, leading by its branches from the air-jackets 4 4$^a$, respectively, by means of which any air contained in these jackets can be drawn upon to supply the compressor 40 in the manner hereinafter set forth.

The fuel of combustion may be supplied to the combustion chamber or cylinder of the engine in any desired way, and we have indicated a hopper 61 61$^a$, connected to the inlet pipes or passages 39 39$^a$, as a means for supplying solid fuel to said cylinder, but more fully shown in Fig. 8 as comprising a conveyer 63, driven by a stem and pulley 64, connected to some operative part of the engine, and having a perforated plate, through which the fuel is discharged into the passage 39. Instead of this hopper in case a liquid fuel of combustion is used such a construction as is indicated in Fig. 9 may be connected to the pipe 39, which comprises, substantially, a bowl or receptacle 66, having an adjustable deflector-valve 67, mounted on the stem 68. Any other feeding device for the fuel may be used which is adapted to the character of the fuel, and it may be arranged in any suitable relation to the operative parts, that shown being found satisfactory.

Having thus described the general construction and arrangement of parts of the engine illustrated, the operation will be largely understood therefrom; but to more clearly set forth and indicate how our invention may be carried out by this or other equivalent constructions we will describe the operation more in detail.

The compressor 40 is filled with air or other compression medium at the desired initial pressure—as, for instance, eighty pounds—either by independent means, as on starting, or by the previous action of the engine. Upon approximately the completion of the downstroke of the working piston 6 and the exhaust of the expanded gases from the working cylinder 1 air from the compressor 40 is admitted to the working cylinder through the passage 39 or 39$^a$, as the case may be, the valves 38 38$^a$, and the combustion-chambers 32 32$^a$. Owing to the difference in size or capacity of the working cylinder and the compressor, which, as above intimated, may vary, but in the present instance is in the relation of about four to one, the air immediately and quickly expands in the working cylinder until it is at a compression, say, of about twenty pounds, and owing to this expansion taking place quickly the temperature of the air is greatly reduced from that at which it was admitted to the said cylinder. The piston of the working cylinder upon its return or up stroke then compresses the air in the working cylinder to about its initial compression—say eighty pounds—while the temperature of the air remains below its previous temperature, and as a consequence of this expansion and relatively low temperature the air is again compressed, with an expenditure of power less than required for its initial compression. At this portion of the stroke air from the ram 50, which is at a compression, say, of about ninety pounds, is injected into the compressed air or into the engine-cylinder, and, if desired, carries with it the fuel of combustion. It may be remarked that one of the functions of the ram is as an injector for the fuel of combustion, and to serve this function it is only necessary that the pressure of the air of the ram shall be sufficient to accomplish this purpose; but we have found it desirable to raise the pressure of the air in the ram slightly above the pressure of the air in the working cylinder, and in the instance indicated it is ten pounds above that pressure. This not only accomplishes the introduction of the fuel of combustion into the compressed air, but also raises the pressure of this compressed air in the working cylinder, and we have found that this is accompanied by so slight an increase of temperature as to be practically immaterial, and it also occurs at a time when temperature is to be increased by the combustion of the fuel, so that in addition to the introduction of the fuel of combustion it results in material advantage in the operation of the engine. The fuel of combustion upon its introduction is at once ignited by any well-known or suitable means, and in the present instance by the electric sparker, and the heat of combustion expands the air or expansion medium against the piston, moving it to the end of its stroke. Before the piston reaches the end of its stroke the exhaust-valve is opened by the lever 24 24$^a$, operated by the cams 20$^b$ or 20$^c$, and the expanded air and products of combustion are allowed to be discharged through the exhaust-port, and we have found that the pressure at which they are discharged is very low and the temperature but little above the atmosphere. As above indicated, the time within which these actions take place is limited and can be regulated to a nicety by the adjustment and shape of the cams and their connections.

It is to be noted that the cams are connected to be driven from the main shaft and operated in accordance with the operations of said shaft, so that it will be seen that if the shaft is rotating rapidly the time of the opening of the exhaust-valve will be small and a less exhaust will occur than if the engine is operating slowly. Thus the operation of the exhaust-valve is in proper relation to the work being done by the engine and is governed thereby. In case the shaft of the engine is rotating slowly the exhaust of the air will be greater, and in case of practically complete exhaustion a full charge of compressed air will be necessary and will therefore be admitted; but, on the other hand, if the shaft is rotating rapidly the exhaust will be less and a full charge of compressed air will not be necessary and will not be admitted. In order to provide further for this operation and to utilize the compressed air when it is not necessary to be admitted to the cylinder, we connect the passage 39 to the air-jacket 4 through the medium of the pipe 56, containing a pressure-valve 57, set to unseat and admit air to said jacket at a pressure a little in excess of that of the compressor, and in this case to about eighty-two pounds, and the excess of compressed air will thus pass into the air-jacket 4, where it expands and cools itself and the cylinder and from whence it will be again taken into the compressor, as hereinafter described.

It will be seen that the primary air-supply to the compressor is through the pipe 49, and this is connected to the coil 58, open to the atmosphere. Connected, as before stated, to this inlet supply-pipe 49 is the pipe 69, leading from the air-jacket 4, so that there are two sources of supply of air to the compressor— one the jacket 4 and the other the coil 58, communicating with the atmosphere. If perchance there is air in the jacket 4 which is above atmospheric pressure, it being expanded in entering the jacket, the air supplied to the compressor will naturally be first drawn from the jacket, and if it is not sufficient for the capacity of the compressor the additional air necessary will be drawn through the coil 58. This is a matter which regulates itself automatically, and it will be seen that from whichever source the air enters the compressor it will be expanded therein to a greater or less extent, reducing its temperature. It will thus be seen that while primarily the air used is drawn through the coil into the compressor after being once compressed thereby portions of it under certain circumstances will be let into the air-jacket, cooling said jacket, and there furnish a partial supply for the next compression, and, as before explained, this air has been cooled by expansion in the jacket and is again cooled by its expansion in the compressor before compression therein. We have found that every alternate or successive expansion and compression of the air is a benefit, making it more susceptible to pressure without corresponding increase of temperature, and thereby obtaining a greater economic efficiency.

It will be observed that the ram 50 is so connected with the air-compressor as to take its supply of air from the compressor at the time that the air therein is under its greatest compression. In other words, the air is delivered to the ram, say, at a pressure of eighty pounds and is expanded in the ram as it is admitted therein, further tending to reduce the temperature. The relation of the ram to the compressor, however, is such that the change of temperature is comparatively small, but compensates the increase of heat due to raising the pressure above its initial pressure, as from eighty to ninety pounds. It will be observed that the pipe 55, leading from the ram, is connected to the passage 39, and if under the circumstances before set forth the conditions of the air in the main cylinder are such that a full charge is not necessary the excess of air from the ram will pass through the pipe 56 into the jacket 4 and be utilized as hereinbefore described, thus adding its supply to the compressor. It is apparent from the above that these operations are all automatic, and the amount of air from the compressor and from the ram supplied to the main cylinder will depend upon the needs of the engine and be in harmony with the work being done thereby.

Heretofore in speaking of the inlet-passage 39 we have referred to special parts composing said passage, as shown in the drawings. As a matter of fact the passage referred to, although composed of several communicating pipes or chambers, is in fact one passage in its integrity and function and is one continuous passage or chamber existing between the cylinder and the discharge-valve of the air-compressor. This passage occupies a relation and performs functions in the economy and regulation of the method and mechanism which differ from those performed by any other parts and serves as a sort of compensating or governing pressure-chamber for the regulation and economic use of the supply of the expansion medium and fuel and the working of the several parts. It will therefore be seen that, while the injection of air from the ram might be introduced directly into the cylinder-head or cylinder itself without entering the passage 39, owing to the nature of the passage 39 and the functions performed by it the same advantage would not be obtained.

Concerning the supply of atmospheric air to the compressor, we find it desirable to admit said air-supply to the compressor through the medium of an intervening chamber placed upon the supply-inlet to said compressor. This chamber we have designated as a "coil;" but it may be of any other form of tortuous chamber, the office served by the chamber being that of a partial obstruction to the free passage of air to said compressor, with the object of partially rarefying said air through suction and the friction of the inflow of air over said obstruction and by the heat of said friction also removing a portion of the moisture, which may be drawn off through a suitable drip-cock. It will be evident that a chamber or inlet of any form containing obstructions suitable for the performance of these functions will serve equally well. We find a tube in the form of a coil satisfactory for the reason that it contains sufficient friction-surface and by being curved or contorted upon itself is convenient in form and cheap of construction.

It will be observed that owing to the economy of our method of operation and the relations of the mechanisms and appliances employed the greatest efficiency is obtained from the expansion medium and fuel and that supplies of expansion medium and fuel are not delivered to the working cylinder unless and until needed therein by the consumption and exhaustion of previous supplies, and until so needed the quantity of expansion medium (as air) taken from the atmosphere is conserved and is not lost by discharge or otherwise nor the energy exerted in its preparation wasted, said medium being meantime utilized to cool parts heated by combustion, and thereby simultaneously better its own condition and compensating the energy exerted in actuating the mechanical parts.

The operations thus far described have been confined to the admission of the air or expansion medium to one end of the working cylinder, and it will be seen that the operations are the same in connection with the other end of the cylinder, and the parts are so constructed and arranged that while the air is being compressed on one side of the compressor-piston it is being expanded on the other side and that the reverse conditions are taking place in the working cylinder, and the same is true of the ram, so that at all stages of the movement of all the parts they are coacting to simultaneously perform their respective and successive functions for both sides of the working cylinder. In this way we produce a double-acting engine in which the energy is exerted on both sides of the piston of the engine and is exerted at each stroke, in contradistinction to the ordinary practice, in which the energy is exerted on only one part of a cycle of operations or one of a series of strokes, the remainder of the time and power of the engine being consumed in preparing for another spasmodic application of energy.

We may employ two or more cylinders coupled to the same shaft or connected in any other desired way, and we may to some extent operate upon a compound system by exhausting one cylinder into another, adding only small quantities of expansion medium or fuel at the proper point of cut-off or stroke.

The general operation of the engine may be said to consist of successive rarefactions or expansions and compressions of the air, and each rarefaction or expansion tends, as we believe and as appears from actual demonstration, to reduce the temperature of the air, notwithstanding the fact that each compression produces some heat; but the result is that more cooling effects are produced than heating effects, and the accummulative or final result is that the air in the cylinder of the engine is in a relatively cool condition, and consequently is in what we consider to be the best condition for producing energy, and the lower the temperature of the expansion medium the better. The exact theory by which these results are attained may not be perfectly known and we think is immaterial.

What we claim is—

1. In the conversion of the energy of fuel and an expansion medium into power, the combination of means for compressing the expansion medium to the desired degree while retaining substantially atmospheric or initial temperature, or reducing the same, a device for at once introducing into the compressed expansion medium the fuel of combustion, with an independent igniter for igniting the fuel, whereby the expansion medium is caused to be expanded and to perform mechanical work, substantially as described.

2. In the conversion of the energy of fuel and an expansion medium into power, the combination of means for successively expanding and compressing the expansion medium without material increase of temperature, a device for at once introducing the fuel of combustion into the compressed expansion medium, with an igniter for igniting the fuel and thereby causing it to expand the compressed expansion medium and perform mechanical work, substantially as set forth.

3. In the conversion of the energy of fuel and an expansion medium into power, the combination of means for compressing the expansion medium without material increase of temperature, a device for at once injecting the fuel into, and simultaneously increasing the degree of compression of the compressed expansion medium, with an independent igniter for igniting the fuel, whereby the compressed expansion medium is caused to be expanded while performing mechanical work, substantially as described.

4. In an internal-combustion engine, the combination with a working cylinder of an air-compressor to compress the air to practically the highest compression in the working cylinder before combustion operatively connected and directly discharging into the cylinder, and coacting to alternately compress and expand and recompress air to obtain the desired compression and temperature of the expansion medium, substantially as described.

5. In an internal-combustion engine, the combination with a working cylinder of an air-compressor to compress the air to practically the highest compression in the working cylinder before combustion operatively connected and directly discharging into said cylinder, an inlet-passage connecting said compressor and cylinder, and a valve controlling said passage, the cylinder and compressor coacting to alternately compress and expand and recompress air to obtain the working compression and temperature of the expansion medium and to permit the transfer of air from said compressor through said passage to said cylinder, substantially as described.

6. In an internal-combustion engine, the combination of a working cylinder and an air-compressor, to compress the air to practically the highest compression in the working cylinder before combustion operatively connected and directly discharging into said cylinder, the compressor being of smaller capacity than the cylinder and both coacting to alternately compress and expand and recompress air to obtain the desired compression and temperature of the expansion medium, substantially as described.

7. In an internal-combustion engine, the combination with a working cylinder, of an air-compressor, operatively connected and discharging into the cylinder, and an air-compressing ram also operatively connected and discharging into the cylinder, substantially as described.

8. In an internal-combustion engine, the combination with a working cylinder, of an air-compressor, an air-compressing ram and connections between the cylinder the compressor and ram, both said cylinder and ram being operatively connected and directly discharging into said cylinder, substantially as described.

9. In an internal-combustion engine, the combination with a working cylinder, of an air-compressor, an air-compressing ram, a passage connecting the compressor with said cylinder, and a pipe connecting the ram with said passage, both the compressor and ram being operatively connected and directly discharging into said cylinder, substantially as described.

10. In an internal-combustion engine the combination with a working cylinder, of an air-compressor, an air-compressing ram, a passage connecting the compressor with the cylinder, a check-valve in said passage and a pipe connecting the ram with said passage beyond the check-valve, substantially as described.

11. In an internal-combustion engine, the combination with a working cylinder, of an air-compressor, an air-compressing ram, a passage connecting the compressor and cylinder, a pipe connecting the ram and passage, and a fuel-supply connected to said passage, substantially as described.

12. In an internal-combustion engine, the combination with a working cylinder having an air-jacket, of an air-compressor, a passage connecting said air-compressor and cylinder and a relief-pipe leading from said passage to said jacket, substantially as described.

13. In an internal-combustion engine, the combination with a working cylinder having an air-jacket, of an air-compressor, a passage connecting said air-compressor and cylinder, a relief-pipe leading from said passage to said jacket, and a pressure-valve in said pipe, substantially as described.

14. In an internal-combustion engine, the combination with a working cylinder having an air-jacket, of an air-compressor, a passage connecting said compressor and cylinder, a relief-pipe connecting said passage and jacket and a pipe connecting said jacket and the inlet of said compressor, substantially as described.

15. In an internal-combustion engine, the combination with a working cylinder, of an air-compressor, a passage connecting said compressor and cylinder, and a pipe provided with a coil connected with the inlet of said compressor, substantially as described.

16. In an internal-combustion engine, the combination with a working cylinder having an air-jacket, of an air-compressor, a passage connecting the air-compressor and cylinder, a pipe leading from said passage to said air-jacket, a pipe connecting said jacket and the inlet of said compressor, said pipe having an opening communicating with the atmospheric air through a check-valve, substantialy as described.

17. In an internal-combustion engine, the combination with an air-compressor receiving expanding and compressing the air, of a working cylinder, of larger capacity than the compressor, receiving the compressed air from the compressor and expanding and recompressing the same, and direct connections between the compressor and cylinder, whereby the compressed air in the compressor is directly discharged into the cylinder to be expanded and recompressed, substantially as described.

18. In an internal-combustion engine, the combination with an air-compressor receiving air, expanding and compressing the same, means for removing moisture from the air before entering the compressor, a working cylinder into which the compressed air from the compressor is directly discharged and in which the air is expanded and recompressed, substantially as described.

19. In a double-acting internal-combustion engine, a working cylinder and piston, an air-compressor to compress the air to practically the highest compression in the working cylinder before combustion, and connections between the opposite ends of the working cylinder and air-compressor, and coacting to alternately compress expand and recompress air to obtain the desired compression and temperature of the air, substantially as described.

20. In a double-acting internal-combustion engine, the combination with a working cylinder and piston therein, of an air-compressor, connections between the opposite ends of the compressor and the opposite ends of said cylinder, and an air-compressing ram, the opposite ends of which are connected with said cylinder, substantially as described.

21. In a double-acting internal-combustion engine, a working cylinder and piston, an air-compressor to compress the air to practically the highest compression in the working cylinder before combustion and coacting to alternately compress, expand and recompress air to obtain the desired compression and temperature of the air, connections between the two ends of the compressor and the opposite ends of said working cylinder, a fuel-supply connected to each end of the cylinder, means for injecting the fuel-supply into the cylinder at each end and independent means for igniting said fuel, substantially as described.

22. In an internal-combustion engine, the combination with a working cylinder and piston, of an air-compressor, means for introducing compressed air and fuel of combustion into said cylinder, means for igniting said fuel and expanding said air, an exhaust-valve, and means for operatively connecting the same with the piston, whereby the exhaust is controlled by the movement of the piston, and the pressures in the working cylinder controlling the admission of air and fuel are determined, substantially as described.

In testimony whereof we have signed our names to this specification in the presence of two subscribing witnesses.

AUGUSTUS HOWARD.
WILLARD R. GREEN.

Witnesses:
F. L. FREEMAN,
PAUL W. STEVENS.